UNITED STATES PATENT OFFICE.

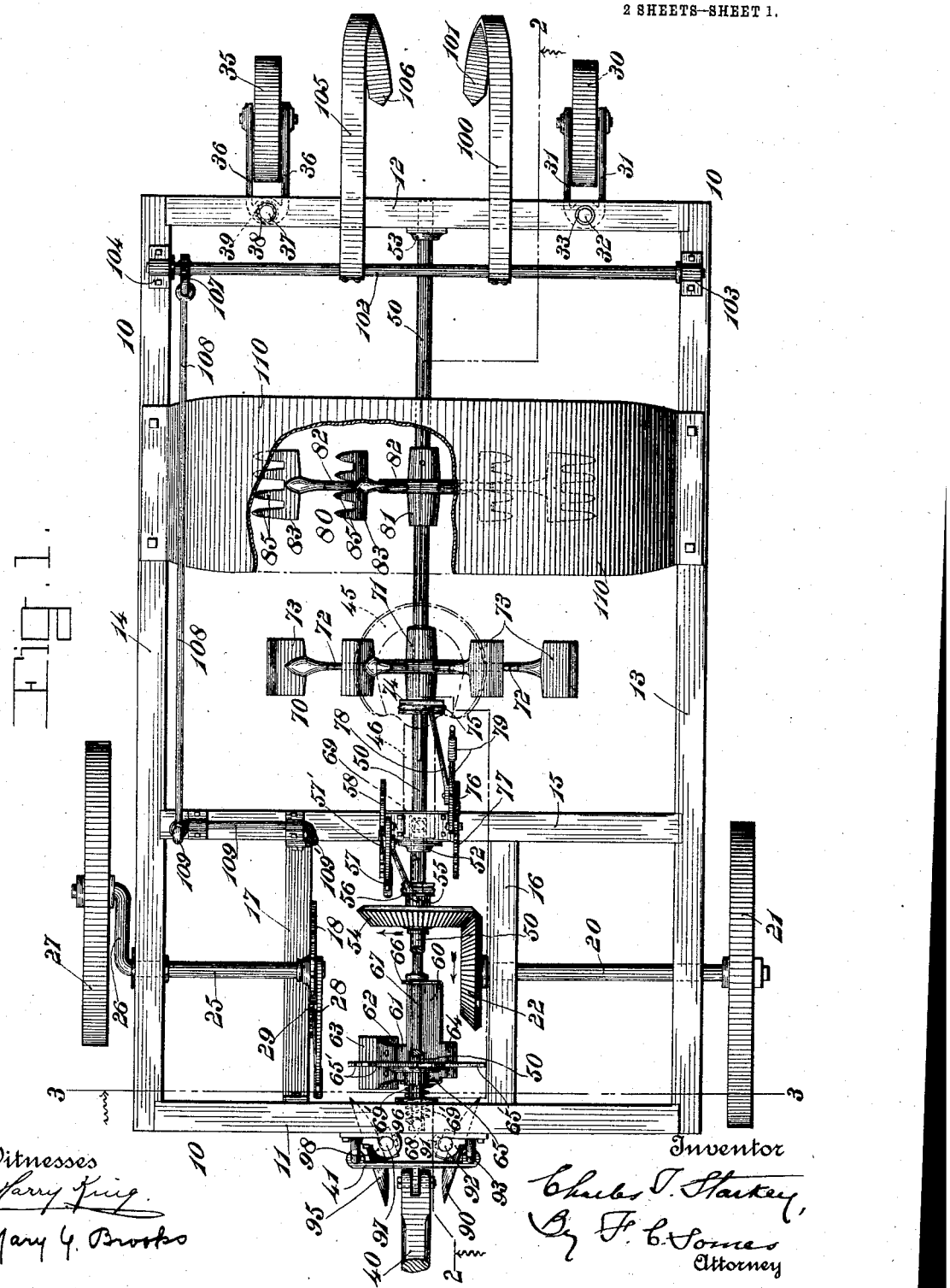

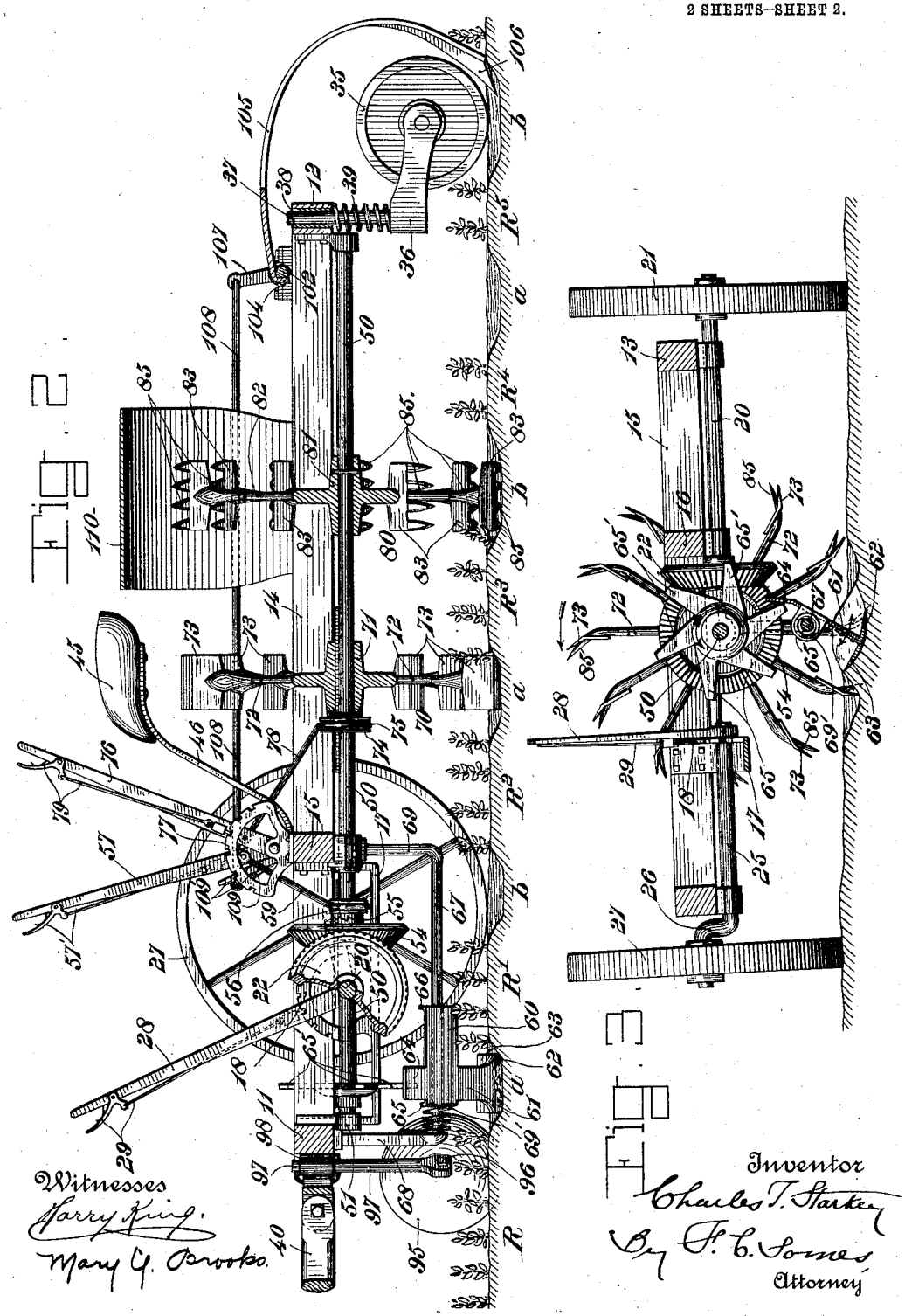

CHARLES THOMAS STARKEY, OF MARTHA, OKLAHOMA.

CULTIVATING COTTON-CHOPPER.

1,054,995. Specification of Letters Patent. Patented Mar. 4, 1913.

Application filed July 24, 1912. Serial No. 711,307.

*To all whom it may concern:*

Be it known that I, CHARLES THOMAS STARKEY, a citizen of the United States of America, and a resident of Martha, in the county of Jackson, State of Oklahoma, have invented certain new and useful Improvements in Cultivating Cotton-Choppers, whereof the following is a specification.

This invention relates to a cultivating cotton chopper comprising means for opening the continuous hill or row on opposite sides thereof to expose the plants to the chopping operation, means for making a preliminary chopping out of sections of the row and plants, means under independent control of the driver for additional trimming of the plants on either side of the preliminary cuts, means for clearing or finishing the cuts and means for closing the hills and properly covering the plants left standing.

An object of the invention is to provide a machine of this character which is simple in construction and efficient in its various functional operations.

Another object of the invention is to subject the intermediate chopping mechanism to direct control of the driver.

Another object of the invention is to adapt the chopping mechanisms to vertical adjustment at the will of the driver to bring them to a proper height for the hills to be chopped.

Figure 1 of the accompanying drawings represents a plan view with parts broken out of a cultivating chopper embodying the preferred form of this invention. Fig. 2 represents a longitudinal section thereof on line 2—2 of Fig. 1. Fig. 3 represents a transverse section thereof on line 3—3 of Fig. 1.

The same reference numbers indicate corresponding parts in the different figures, round numbers being used to indicate the principal elements and intermediate numbers for the subordinate features thereof.

The frame 10 of this cotton chopper is preferably in skeleton form comprising a front bar 11, a rear bar 12, a left side bar 13 and a right side bar 14. A crossbar 15 extends from side to side between the side bars forward of the transverse center of the frame. A short longitudinal bar 16 connects the front bar 11 with the crossbar 15 at the left of the longitudinal center of the frame. A depressed bracket 17 is connected at one end to the front bar 11 and at its rear end to the cross-bar 15 at the right of the longitudinal center of the frame. This bracket is provided with a toothed segment 18. A short driving axle 20 is supported in bearings of the side bar 13 and the bar 16. This axle is provided at its outer end with a supporting or ground wheel 21 and at its inner end with a bevel gear 22. A short crank axle 25 is supported in alinement with the axle 20 in bearings in the side bar 14 and segment 18 as shown in Figs. 1 and 3. This crank axle has a crank 26 at its outer end which carries the ground wheel 27. The crank axle is provided at its inner end with an adjusting lever 28 which is provided with an ordinary lever lock 29 adapted to engage the notches of the toothed segment 18 for locking the crank axle in different positions to vary the height of the frame from the ground.

The frame 10 is provided with wheel supports at its rear. Any suitable supports of this character may be employed. The supports shown for this purpose comprise a left caster wheel 30 and a right caster wheel 35. The caster wheel 30 is supported in a swiveled frame 31 having a shank or spindle 32 which is supported in a socket 33 on the rear bar 12. The caster wheel 35 is supported in a swiveled frame 36 having a shank 37. This shank is adapted to slide vertically in a sleeve 38 in the crossbar 12 and a spring 39 is disposed between said crossbar and frame and acts expansively to hold the shank extended and permits a sliding of the shank in its socket when the crank axle 25 is adjusted to raise and lower the frame. A draft pole 40 is connected with the front bar 11 by a clevis 41 or other suitable connecting means.

A seat 45 is mounted on the frame 10. The seat shown is attached to the upper end of a seat support 46 secured at its lower end to the cross-bar 15. A main driving shaft 50 extends longitudinally of the frame through the center thereof, being supported in hanger bearings 51 secured to the front bar 11, 52 to the crossbar 15 and 53 to the rear bar 12. This shaft is provided with a bevel gear 54 adapted to mesh with the bevel gear 22 on the axle 20. The bevel gear has a clutch hub 55 and a clutch member 56 splined on the shaft 50 is adapted to slide into and out of engagement with said clutch hub. This clutch member is actuated by a lever 57 pivoted to a toothed segment 58 and connected by a rod 59 with a clutch collar 56' disposed in the groove of the clutch member 56. The lever 57 is provided with the usual lever lock mechanism 57' which engages the notches of the segment 58.

This cultivating chopper is provided with three chopping mechanisms to wit: a primary duplex oscillating chopper 60, a finishing chopper or clearer 80 and an intermediate chopper 70. The duplex chopper 60 is adapted to make two cutting strokes to one of each of the others and the primary and finishing chopper are timed to operate in the same or substantially the same path. The intermediate chopper 70 is independent of the other choppers and under the control of the driver, being shiftable backward or forward into position to chop off on either side of the paths formed by the primary chopper.

The primary chopper 60 has a shank 61 provided at its lower end with lateral blades 62 and 63 projecting in opposite directions. The body of the chopper is provided with an upwardly projecting actuating tail 64 and with ears 65 and 66 at its front and rear ends. A longitudinal rod 67 is supported at its opposite ends in a dependent front hanger 68 secured to the front bar 11 and a dependent hanger 69 secured in the crossbar 15. This rod is passed through the ears 65 and 66 and the chopper 60 is supported by and oscillates on said rod. The means shown for actuating this duplex primary chopper 60 comprise a star wheel 65' fixed on the shaft 50 and a torsional spring 69' disposed on the rod 67 and having its front end secured to the hanger 68 and its rear end to the chopper 60. The star wheel rotates in the direction of the arrow thereon and has six tangential arms which engage successively the tail 64 of said chopper at each complete revolution of the shaft 50 as clearly shown in Fig. 3. Each tangential arm engaging the tail 64 swings the blade end of the chopper toward the right (toward the left as viewed in Fig. 3) and the blade 63 of said chopper cuts a path across the continuous hill or row. This swing of the chopper under the action of a tangential arm tensions the spring 69' and when said arm passes the tail 64 said spring swings the chopper on its return stroke toward the right (toward the left as viewed in Fig. 3) and the blade 62 cuts another path across the hill in rear of the path cut in the positive stroke of the star wheel.

The intermediate chopper 70 is a rotary chopper comprising a hub 71 provided with twelve radial arms 72 having hoes or cutters 73 at their outer ends. The hub 71 has a grooved boss 74 provided with a loose collar 75. An actuating lever 76 is pivoted to a toothed segment 77 mounted on the crossbar 15 and a link 78 connects said lever with said collar. This lever is provided with an ordinary lever lock 79 which engages the toothed segment 77. By means of this lever the chopper 70 can be moved forward or backward under the control of the driver on the seat to chop out a plant at the rear of the forward block or a plant at the front of the rear block of the path in which the chopper is traversing.

The rotary finisher or clearer 80 is fixed on the shaft 50 in position to traverse the paths formed by the primary and intermediate choppers to take out any plants skipped by said choppers and to clear said paths of debris or cut plants. This clearer comprises a hub 81 and twelve radial arms 82 severally provided at their outer ends with cutters or rakes 83. These rakes are preferably in the form of a mower guard, being provided with a series of sharpened prongs 85.

Two hill openers preferably in the form of dished plow disks 90 and 95 are disposed in front of the oscillating chopper 60 in position to straddle the continuous hill or row of plants and to operate to cut down or open the sides of said hill or row preparatory to the action of the choppers in cutting said row into blocks. The left plow disk 90 turns on a stub 91 secured to the lower end of a vertically adjustable shank 92. The upper end of this shank is supported in a clamping socket 93 attached to the front crossbar 11. The right plow disk 95 is of similar construction to the left plow disk 90 and is likewise adjustable. It turns on a stub 96 secured to the lower end of a vertically adjustable shank 97, the upper end of this shank being supported in a clamping socket 98 also attached to the front crossbar 11.

Cultivators or hill closers 100 and 105 are disposed at the rear of the machine and operate to throw back the dirt thrown out by the hill openers. These hill closers are preferably in the form of elongated downwardly and forwardly curved steel bands connected at their upper ends with a transverse shaft 102 and having their plow points 101 and 106 slightly inclined toward each other. The shaft 102 is supported in bearings 103 and 104 on the frame 10. A crank 107 on said shaft is connected by a rod 108 with a crank shaft 109 supported on the crossbar 15. This crank shaft 109 is provided at its inner end with a foot lever 109' in proximity to the driver who sits on the seat 45. A guard or hood 110 is preferably disposed over the finishing clearer 90, being secured at its opposite ends to the side bars of the frame.

In the operation of this cultivating chopper, the machine is drawn over the field straddling a continuous hill or row R of the plants to be cultivated or thinned. The plows 90 and 95 cut down the opposite sides of the continuous hill or row and prepare it for the cutting operation of the choppers to follow. The draft of the machine rotates the driving axle 20 and bevel gear 22 in the direction of the arrow adjacent to said gear in Fig. 1 and motion is thereby transmitted through the bevel gear 54 in the direction of the arrow adjacent thereto and thence through the clutch member 56 when in engagement with the hub of said bevel gear to the driving shaft 50. The primary chopper 60 is swung to the right on its positive stroke by one of the arms of the star wheel 65' and cuts a path a transversely and somewhat diagonally across said row. As the machine moves forward the chopper 60 is released from the engaging arm of the star wheel and the spring 69' swings said chopper to the left on its return stroke, whereby another crosspath b is cut somewhat diagonally across the row hill and a block R' comprising four plants more or less is formed. At the same time that the primray chopper 60 is making its stroke toward the right, one of the hoes of the intermediate chopper 70 traverses one of the paths a previously formed by said primary chopper and the driver shifts said intermediate chopper into position as desired to cut out an additional plant from the block $R^3$ behind said chopper or from the block $R^2$ in front thereof. At the same time that the choppers aforesaid are doing the work indicated, one of the rakes of the finisher or clearer 80 passes through one of the paths b previously cut by the primary chopper on its return stroke and clears said path of any debris and cuts out any plants left by the previous choppers. The plants are thus reduced to a proper stand in individual hills or blocks as $R^4$ and $R^5$.

The driver raises and lowers the choppers to suit the height of the hills by adjusting the crank axle 25 by means of the lever 28. The covers 100 and 105 are swung into and out of operative position by the driver through the medium of the foot lever 109. When in operative position these hill closers after the proper chopping and finishing is effected cover and close the hills by throwing up dirt along the sides thereof.

A cultivating chopper thus constructed is under control of the driver from his seat and performs the cultivating and chopping in a thorough and efficient manner.

I claim as my invention:

1. In a cultivating chopper, the combination of a primary chopper, a clearer arranged to operate in the crosspaths formed thereby, an intermediate chopper disposed between said primary chopper and clearer, means under the control of the driver for shifting the position of said intermediate chopper relative to said primary chopper and clearer, and driving means for operating in unison said primary chopper, intermediate chopper and clearer.

2. In a cultivating chopper, the combination of an oscillating primary chopper, a rotary clearer arranged to operate in the crosspaths formed thereby, a rotary intermediate chopper disposed between said primary chopper and clearer, means under the control of the driver for shifting the position of said intermediate chopper relative to said primary chopper and clearer, and driving means for operating in unison said primary chopper and clearer.

3. In a cultivating chopper, the combination of a primary chopper, a clearer arranged to operate in the cross paths formed thereby, an intermediate chopper disposed between said primary chopper and clearer, means under the control of the driver for shifting the position of said intermediate chopper relative to said primary chopper and clearer, driving means for operating in unison said primary chopper, intermediate chopper and clearer, hill openers arranged forward of said primary chopper, and hill closers disposed in rear of said clearer.

4. In a cultivating chopper, the combination of a wheeled frame comprising a crank axle carrying one of the supporting wheels, a primary chopper, a clearer operative in the crosspaths formed thereby, an intermediate chopper disposed between said primary chopper and clearer, means under the control of the driver for shifting the position of said intermediate chopper relative to said primary chopper and clearer, means under the control of the driver from his seat for shifting the position of the crank axle to raise or lower said frame, and driving means for operating in unison said primary chopper, intermediate chopper and clearer.

5. In a cultivating chopper, the combination of a frame, a straight axle journaled in the forward part thereof and provided with a supporting wheel, a crank axle in alinement with said straight axle and provided with a supporting wheel at its crank end, supporting wheels for the rear of said frame, a longitudinal driving shaft supported in said frame, transmitting mechanism between said driving shaft and one of said axles, a series of choppers operated by said driving shaft, a driver's seat on said frame, means under the control of the driver from his seat for shifting said transmitting mechanism into and out of gear, and means operative by the driver from his seat for shifting the position of said crank axle to raise and lower said frame.

6. In a cultivating chopper, the combination of a frame, a straight axle journaled in the forward part thereof and provided with a supporting wheel, a crank axle in alinement with said straight axle and provided with a supporting wheel at its crank end, supporting wheels for the rear of said frame, a longitudinal driving shaft supported in said frame, transmitting mechanism between said driving shaft and one of said axles, a series of choppers operated by said driving shaft, hill closers disposed at the rear of the machine, a driver's seat on said frame, means under the control of the driver from his seat for shifting said transmitting mechanism into and out of gear, means operative by the driver from his seat for shifting the position of said crank axle to raise and lower said frame, and means operative from the driver's seat for shifting said hill closers into and out of operative position.

7. In a cultivating chopper, the combination of a wheeled frame, a longitudinal driving shaft supported in said frame, a longitudinal rod disposed below said shaft and provided with dependent hangers connected with said frame, an oscillating chopper on said rod and provided with a duplex hoe projecting laterally in opposite directions, and with an upwardly extended actuating tail, a star wheel fixed on said shaft and adapted to engage said tail for swinging said oscillating chopper in one direction, and a torsional spring disposed on said rod operative to swing said chopper in opposite direction.

8. In a cultivating chopper, the combination of a wheeled frame, a longitudinal driving shaft supported in said frame, a rotary chopper provided with radial arms carrying choppers, an oscillating chopper provided with a duplex hoe projecting laterally in opposite directions, means for supporting said oscillating chopper in a plane below said driving shaft, a star wheel provided with arms adapted to engage said oscillating chopper to swing it in one direction, and a spring for swinging said oscillating chopper in the other direction, said star wheel having half the number of arms of the rotary chopper.

CHARLES THOMAS STARKEY.

Witnesses:
BAILEY C. BROWDER,
MATTHEW L. WANN.

Copies of this patent may be obtained for five cents each, by addressing the "Commissioner of Patents, Washington, D. C."